United States Patent [19]
Cole, Jr.

[11] Patent Number: 5,153,014
[45] Date of Patent: * Oct. 6, 1992

[54] METHOD FOR SUPPRESSING DUST IN GRAIN HANDLING AND STORAGE USING EDIBLE SMALL BUBBLE FOAM

[76] Inventor: Howard W. Cole, Jr., P.O. Box S, Burgin, Ky. 40310

[*] Notice: The portion of the term of this patent subsequent to Aug. 13, 2008 has been disclaimed.

[21] Appl. No.: 640,036

[22] Filed: Jan. 11, 1991

Related U.S. Application Data

[63] Continuation-in-part of Ser. No. 333,422, Apr. 4, 1989, Pat. No. 5,039, 348.

[51] Int. Cl.⁵ .................. A23B 9/00; B08B 15/00
[52] U.S. Cl. ..................... 426/302; 134/25.1; 134/15.3; 134/34; 426/564
[58] Field of Search ............ 426/302, 564, 52, 622, 426/568, 571; 134/25.1, 25.3, 34

[56] References Cited

U.S. PATENT DOCUMENTS

| | | | |
|---|---|---|---|
| 3,814,816 | 6/1974 | Gunther | 426/63 |
| 4,000,992 | 1/1977 | Cole, Jr. | 55/87 |
| 4,015,019 | 3/1977 | Sawada et al. | 426/46 |
| 4,032,903 | 12/1976 | Boyce et al. | 426/46 |
| 4,390,450 | 6/1983 | Gibson et al. | 426/568 |
| 4,409,248 | 10/1983 | Lehnhardt et al. | 426/52 |
| 4,542,035 | 9/1985 | Huang et al. | 426/565 |
| 4,555,417 | 11/1985 | Gibson et al. | 426/361 |
| 4,874,626 | 10/1989 | Castenmiller et al. | 426/564 |

*Primary Examiner*—Steven Weinstein
*Assistant Examiner*—Jean L. Aberle
*Attorney, Agent, or Firm*—Middleton & Reutlinger

[57] ABSTRACT

A method for suppressing dust during grain handling and storage, using small bubble foam created from an edible foam-producing surfactant.

6 Claims, No Drawings

METHOD FOR SUPPRESSING DUST IN GRAIN HANDLING AND STORAGE USING EDIBLE SMALL BUBBLE FOAM

This application is a division of U.S. Pat. No. 5,039,348, issued on Aug. 13, 1991 Ser. No. 07/333,422 and having a filing date of Apr. 4, 1989.

BACKGROUND OF THE INVENTION

The problem of grain-storage explosions has been very serious for many years. Grain dust is released from the grain during transport and handling of the grain. When the dust is confined, as in a grain storage elevator, it can ignite, causing an explosion. Such explosions have resulted in substantial loss of human life and of property, and, until now, no effective solution has been found to the problem.

Howard W. Cole, Jr. has invented a machine and method for making small bubble foam having bubble diameters from 50 to 200 microns when first ejected from the foam generator as described in U.S. Pat. Nos. 3,811,660 and 4,400,220, which are hereby incorporated by reference. A third Cole patent, U.S. Pat. No. 4,207,202, describes an improved version of the foam generator and is also hereby incorporated by reference. In those patents, in order to make suitable foam for dust suppression, air, water and surfactant are pumped through tortuous passages to form very small bubbles as explained in those patents. Unfortunately, until now, we have not been able to apply small bubble foam to grain or other food products, because the surfactants used to make the small bubble foam wire not approved for use with food.

SUMMARY OF THE INVENTION

The present invention solves the problem of accumulating grain dust which causes the fires and explosions.

The present invention provides a small bubble foam made entirely of edible materials for use in conjunction with other grains or other edible materials.

The present invention provides a method for producing edible small bubble foam and applying it to grain to prevent explosions in grain storage facilities.

DESCRIPTION OF THE PREFERRED EMBODIMENT

In an attempt to make an edible small bubble foam for use with grains or other edible materials as described in the patents cited above, we tested many food-based surfactants on Howard W. Cole, Jr.'s equipment and found them to be unsatisfactory. The foams they produced were wet and weak, with insufficient volume formation. They produced foams like the froth on beer but nothing that would keep its structure for any long period of time. We needed a firm foam which would produce small bubbles in the range of about 50-200 microns in diameter with an expansion factor of about 20-40 when first ejected from the foam generator. (The expansion factor is the volume of foam divided by the volume of water and surfactant used to make the foam). After extensive testing, we found one edible protein that produced a meringue-type foam with firm holding properties. The initial bubbles ejected from the foam generator were in the range of about 50-200 microns diameter, and the expansion factor was between about 20 and 40. This is exactly what we needed for dust suppression and fire protection in grains.

The protein we used was a soybean protein purchased from the Gunther protein division of A. E. Staley Co. and sold under the trademark of VersaWhip 500. Originally, we purchased the VersaWhip 500 powder, added hot water to put it into solution, and then used it as the surfactant, combining it with air and water in the machine described in U.S. Pat. No. 4,207,202. Later, we went to the manufacturer of the VersaWhip 500 product and bought it in its liquid form, before it was dried to a powder, finding that to be more convenient for our purposes.

We do not know what the VersaWhip 500 is exactly, except that it is a pepsin-modified soybean-based protein with sodium benzoate added as a preservative. The manufacturer says that its method or production and composition are a trade secret.

Since we are now able to produce the quality of edible foam we require for dust suppression, we can apply the foam to the grain at the transfer points and/or onto the surface of masses of grain as described in U.S. Pat. No. 4,400,220 to suppress the grain dust and thereby protect against grain fires and explosions.

Applicant's disclosure and claims in the parent application point out that the performance of the foam is dependent on the size and uniformity of bubbles. Applicant has now discovered that foam ejected from the foam generator having a initial small bubble size ranging in diameter of from about 50 to 200 microns tend to coalesce with one another to form some small bubbles having a diameter in the range of about 50 to 400 microns before making contact with the dust and/or grain particles, due to the residence time required to apply the foam to the substrate. Small bubbles having a diameter in the range of about 50 to 400 microns in diameter produce acceptable foam when uniformly mixed together with the small bubbles ranging in size of about 50 to 200 microns. The foam produced has the high elasticity, resilience, and high surface viscosity needed to maintain the requisite stability required for the structural integrity of the foam as it is applied to the grain and grain dust particles.

What is claimed is:

1. A method for dust suppression in grain-handling and storage operations, comprising the following steps:
    a. generating a small bubble foam by pumping air, water and an edible surfactant through tortuous passages to produce a small bubble foam having bubble diameters in the range of about 50 to 400 microns and an expansion factor of about 20 to 40; and
    b. applying the small bubble foam to the grain at transfer points, including the point at which grain falls into the storage bin so as to coat dust particles, causing them to adhere to other particles so that they fall and do not continue floating in the air;
    c. wherein the edible surfactant is a food-based protein.

2. A method as recited in claim 1, wherein the edible surfactant is a pepsin-modified, soybean-based protein.

3. A method as recited in claim 1, wherein the edible surfactant is a pepsin-modified, soybean-based protein mixed with sodium benzoate.

4. A method for suppressing dust in grain-handling and storage operations, comprising the steps of:
    (a) generating an edible small bubble foam, said bubble foam having bubble diameters in the range of about 50 to 400 microns and an expansion factor of about 20 to 40, formed by pumping air, water, and an edible surfactant comprised of a food based protein continuously through a device having tortuous passages; and (b) applying said edible small bubble foam directly to grain in a continuous process at points in the grain transfer system, wherein said edible small bubble foam is adsorbed by the grain dust particles causing said grain dust particles to adhere to other particles of grain and grain dust and fall out of suspension.

5. A method as recited in claim 4, wherein the edible surfactant is a pepsin-modified, soybean-based protein.

6. A method as recited in claim 4, wherein the edible surfactant is a pepsin-modified, soybean-based protein mixed with sodium benzoate.

* * * * *